Nov. 8, 1938.	H. S. CAMPBELL	2,135,699
ROADABLE AUTOROTATIVE WINGED AIRCRAFT
Filed Jan. 13, 1936	7 Sheets-Sheet 1

INVENTOR
Harris S. Campbell
BY
Synnestvedt & Lechner
ATTORNEYS

Nov. 8, 1938.                H. S. CAMPBELL                 2,135,699
              ROADABLE AUTOROTATIVE WINGED AIRCRAFT
                    Filed Jan. 13, 1936         7 Sheets-Sheet 3

Fig.4.

INVENTOR
Harris S. Campbell
BY
Synnestvedt & Lechner
ATTORNEYS

Patented Nov. 8, 1938

2,135,699

UNITED STATES PATENT OFFICE 2,135,699

ROADABLE AUTOROTATIVE-WINGED AIRCRAFT

Harris S. Campbell, Willow Grove, Pa., assignor to Autogiro Company of America, Willow Grove, Pa., a corporation of Delaware Application January 13, 1936, Serial No. 58,831

1 Claim. (Cl. 244—18)

This invention relates to an improved vehicle adapted for alternative use as an aircraft and as a road or land vehicle.

One of the principal objects of the invention is the provision of a vehicle or aircraft which is readily convertible for use in the air or for use on the ground, particularly for road travel. In consequence of the means provided for this purpose, the usefulness of aircraft may be greatly extended, for instance, by virtue of the fact that my improved aircraft may be landed at a point in the neighborhood of any desired destination, and then converted for road travel from that point to any desired location on the highways or the like. Though not limited in this respect, a machine of this type is of especial usefulness for private ownership and operation, in accordance with which an owner may readily stow his craft in a garage adjacent to his home and then drive the machine on the highways to a point suitable for take-off, at which the machine may be converted for air travel and then flown to any desired destination.

With the above purposes in view, the invention contemplates a machine having a sustaining rotor, preferably of the air actuated and multibladed type, the blades of which are readily foldable for storage so as to occupy a minimum of space.

Still further, provision is made for steering, braking, and driving, landing wheels so as to make it readily maneuverable on the ground. The machine, of course, is also equipped with full controls for air travel. Preferably these controls comprise a movable mounting for the sustaining rotor of the type disclosed, for example, in the co-pending application of Juan de la Cierva, Serial Number 645,985, filed December 6, 1932. While this type of control need not be considered in detail herein, it should be noted that it is especially adaptable to the present purposes for the reason that control in pitch and roll (and also, if desired, in yaw) is readily afforded thereby, thus dispensing with certain control surfaces necessary in airplanes, particularly the ailerons and/or fixed wings for mounting the ailerons. While I also contemplate folding of the sustaining blades for storage and for road travel, the details of mechanism providing for such folding need not be discussed in detail herein since they are already known and are shown, for example, in patent of Harris S. Campbell, No. 1,989,544, issued January 29, 1935.

In addition to the more or less general objects and advantages referred to above such as provision of all the necessary functions for air and road travel, and ready conversion between the two, the invention also has in view a number of more or less specific objects as follows:

In accordance with one feature of the invention, provision is made for the employment of a power take-off, clutch and gearing unit closely associated with a prime mover, which unit is adapted for the delivery of torque to the wheels for driving the machine on the ground and also for the delivery of torque to the sustaining rotor for the purpose of initiating rotation thereof prior to take-off. This latter function is preferably carried out in the manner described and claimed in the co-pending application of Juan de la Cierva, Serial No. 738,349, filed August 3, 1934, in which application means are disclosed for imparting rotation to the rotor above the normal R. P. M. while the blades are set at a relatively low or zero incidence. In effecting a take-off in this way, the incidence of the blades is set up preferably to a value higher than the usual autorotational incidence of flight, with the result that the machine takes off substantially vertically, i. e., hops from the ground without forward roll. During the take-off, of course, the drive connection with the rotor is disconnected (either manually or automatically as by an overrunning clutch) and after the initial "hop" the propulsive airscrew carries the machine away in translational flight. This type of take-off is of especial use in connection with features of the present invention for the reason that highways themselves may provide adequate space for landings and take-offs. Thus, the machine may be landed on a highway close to an ultimate destination and driven from there to the desired location.

The invention is of especial importance in the "direct control" and "direct take-off" type of craft because such a craft may operate safely under more adverse weather and terrain conditions than other types of craft, and thus may be placed more frequently in a position where road travel would be desirable.

The invention contemplates the provision of drive shafting for transmitting torque from the prime mover to the rotor for take-off purposes and also from the prime mover to the wheels for driving purposes. Still more specifically, the driving mechanisms for transmitting torque from the power take-off unit above mentioned to the rotor and to the wheels, are each equipped with a clutch device whereby the drives may selectively be engaged or disengaged.

Another object of the invention is the provision of controlling means for the clutches just referred to, which controlling means interrelates the operation of the clutches in a manner to provide for actuation thereof in the opposite senses.

Another feature of the invention is involved in clutch means in addition to the others already mentioned, which additional clutch means is common to both drives (that is, the drive to the rotor and the drive to the wheels), so that complete disconnection of these drives may be effected during air travel, at which time the full power of the prime mover, of course, should be delivered to the propulsive air-screw. The invention further has in view adapting driving mechanism of the character already mentioned, to different arrangements of landing wheels, as will be brought out more fully hereinafter.

According to the invention, structure is provided for shock absorption upon landing and also for braking and steering the landing wheels, in addition to driving them.

In order to increase the safety of travel of the craft on the ground and also for other purposes more fully discussed hereinafter, the invention makes provision for stowing the propulsive air-screw in a suitable compartment provided in the body of the machine, in view of which, operation of the propulsion engine on the ground is not dangerous. Related to this feature is the provision of a fan (preferably also including a fly wheel) which may readily be mounted in place of the propulsive air-screw when the machine is to be driven on the ground. Thus, adequate cooling of the engine is provided for during road travel and (when the fly wheel feature is also adopted) smoothness of the engine operation is increased so as to better adapt it to operation at low speeds such as required at times on the ground.

How the foregoing objects and advantages are secured, together with others which will occur to those skilled in the art, will be more apparent from the following description making reference to the accompanying drawings, in which—

At this point it should be noted that while I have employed the term "aircraft" in referring to the machine of this invention, it will be understood that this term is not to be taken as excluding any of the land travel features embodied in the machine.

Figures 1, 2:
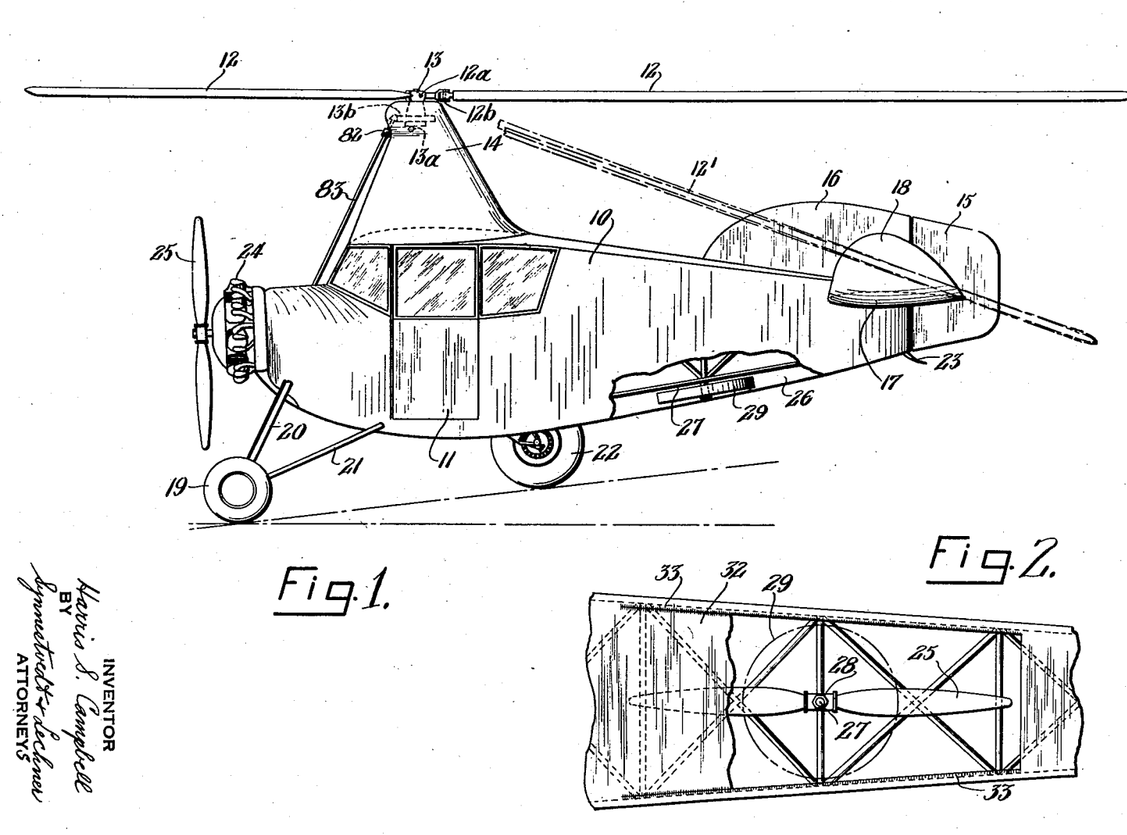
Figure 1 is a side view of a machine constructed in accordance with this invention, a portion of the body being broken away to disclose the stowage compartment for the air-screw.
Figure 2 is a bottom plan view of a portion of the body of the machine shown in Figure 1, part of the covering being broken away to further illustrate the stowage compartment.

The craft shown in Figure 1 includes a body 10 which, of course, is provided with an occupant's compartment accessible, for example, through the door 11. The sustaining rotor comprises a plurality of blades 12 which are attached to the common upright hub 13 by flapping and drag pivots 12a and 12b, the hub being mounted at the top of a pylon or other support 14. As already mentioned, for purposes of control in flight, the hub of the rotor is preferably mounted for movement, as by pivots, one of which appears at 13a, in accordance with the disclosure of the de la Cierva application, Serial Number 645,985. Though not essential, the machine is preferably equipped with a rudder 15 which may suitably project rearwardly from the fuselage and from the vertical fin 16. The empennage further includes horizontal stabilizing surfaces 17 preferably having upturned tips 18, the overall width of which, for the sake of road travel, approximates that of the undercarriage later to be described.

Figure 3:
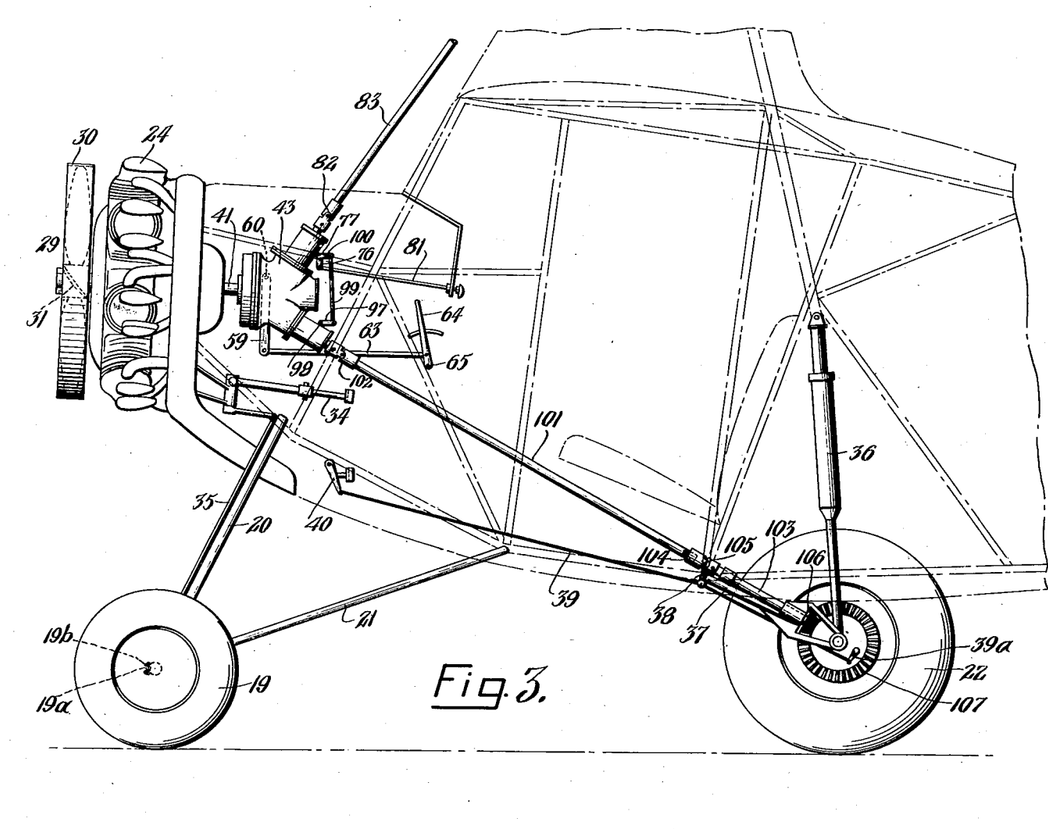
Figure 3 is a side elevational view of a number of features of the driving mechanisms incorporated in the machine of Figures 1 and 2, a portion of the body of the machine being shown in this view in dot and dash outline.

The arrangement of Figures 1 and 3 incorporates a pair of forward landing wheels 19 supported by suitable struts 20 and 21, and a single rear landing wheel 22 which, in accordance with the disclosure of the co-pending application of Agnew E. Larsen, Serial Number 39,671, filed September 9, 1935, is located rearwardly of the center of gravity of the machine as a whole though relatively close to the center of gravity. Thus, the three wheels support the craft on the ground in tripod fashion. If desired, a tail skid 23 may be employed in order to prevent damage to the empennage.

The prime mover or propulsion engine 24 is located in the nose of the machine and during air travel drives the propulsive air-screw 25. This screw is made readily dismountable so that during road travel it may be removed and stowed within a compartment 26 provided in the underside of the body of the machine, in which it may be supported as by a pin or shaft 27 carrying a readily removable nut 28. The mounting of the air-screw in this compartment is clearly shown in Figure 2. This view also illustrates a fan device 29 in dot and dash outline, the fan being adapted for connection with the engine 24 in place of the screw 25 (see Fig. 3) during travel of the machine on the ground. This fan includes a rim 30 and blades 31 and is preferably of relatively heavy construction so as to serve also as a fly wheel and thus aid in smoothing out the operation of the engine, particularly at low speeds as may occur from time to time during road travel.

From the above, and comparison of Figures 1, 2 and 3, it will be observed that the stowage compartment 26 may be employed alteratively to receive the air-screw and the fan.

Referring further to Figure 2, the compartment is equipped with a closure 32 which may comprise a portion of the fabric or other similar covering for the fuselage, which closure is equipped with separable fasteners or "Zippers" 33, by means of which a large opening may be exposed for convenient insertion and removal of the air-screw.

Because of the location of the rear wheel 22 relatively close to the center of gravity of the machine, and also because of the displacement of the two forward wheels well-forwardly of the center of gravity, the supporting struts for the front wheels need not, in all cases, incorporate shock absorbers. However, the two front wheels are preferably mounted for movement about generally upright pivots 19a to provide for steering, and, as seen in Figure 3, a steering control is provided in the form of foot-pedals 34 which are coupled as by means of push-rods 35 with the knuckles 19b.

The mounting for the rear wheel 22 includes a relatively large shock strut 36 which is secured to some of the main elements of the fuselage frame. The wheel 22 is further carried by means of the fork 37 which is pivoted as at 38 so that the wheel may move upwardly and downwardly and landing shocks or road bumps may be cushioned. This wheel is preferably also provided with a brake, the specific structure of which need not be considered herein, although it is mentioned that the brake operating lever 39a may be operated by the control element 39 connected with the foot pedal 40.

Figure 4:
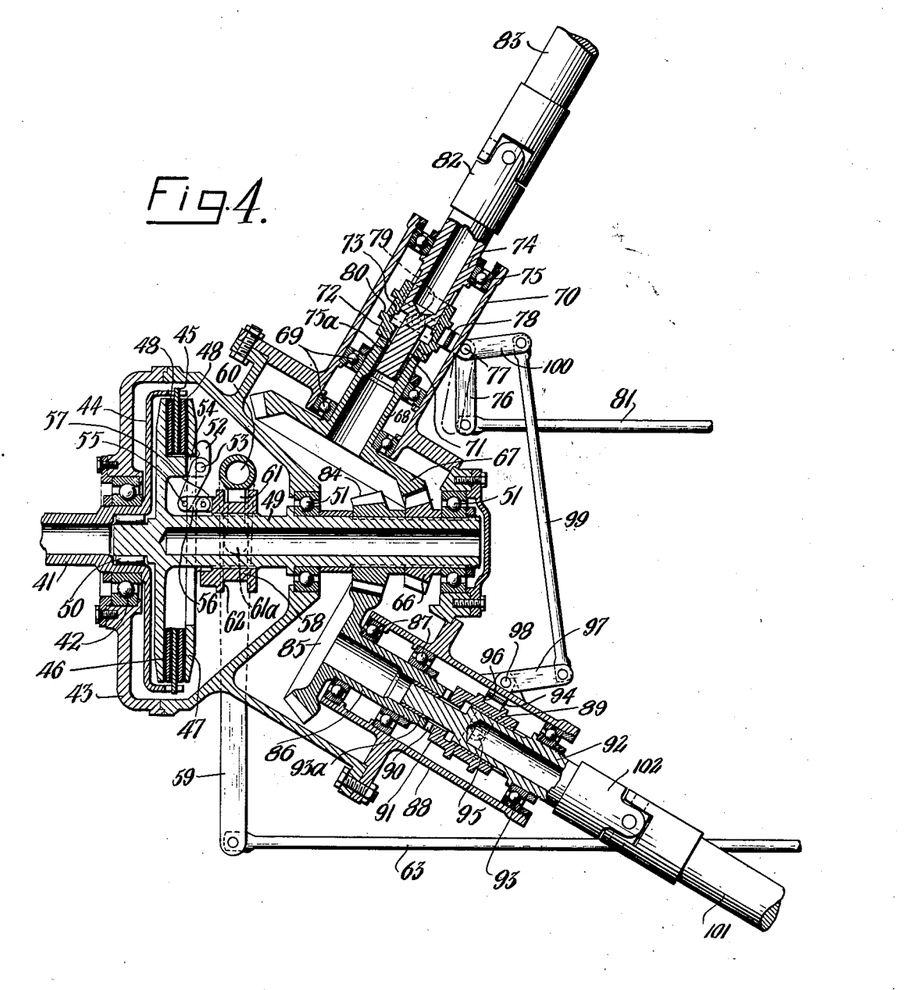
Figure 4 is a vertical sectional view through the power take-off, clutch and gearing unit incorporated in the arrangement of Figures 1 to 3 inclusive.

At the rear of the engine 24 a power take-off shaft 41 projects, this shaft preferably being journaled as by a bearing 42 within a housing 43. At its rear end, the shaft 41 carries a drum or equivalent device 44 cooperating with the clutch plate 45 which is interposed between a pair of additional plates 46 and 47. Suitable friction material 48 may be interposed between the clutch plates. The two plates 46 and 47 are relatively movable toward and away from each other axially of the shaft 49, on which the plate 46 is directly carried. Shaft 49 may conveniently be journaled as by rollers 50 and bearings 51—51. These latter bearings (51—51) also cooperate with the housing 43 and the arrangement thus provides rigid support for the driving shaft 41 as well as the driven shaft 49 in a single housing structure.

The clutch 45—46—47 is operated upon movement of the plates 46 and 47 toward each other to clamp the intermediate plate 45 therebetween. This is effected by means of one or more actuating elements 52 pivoted as at 53 to ears 54 carried by the plate 46. One end of the arm 52 is adapted to bear on the outer face of clutch plate 47 and the other end is connected by means of a pin 55 with a link 56 which in turn is pinned to ears 57 provided on the collar 58. This latter member is mounted with freedom for rotation with respect to shaft 49 but may be displaced axially of the shaft so as to cause movement of the actuating arms 52. Longitudinal movement of the collar 58 is effected by a control lever 59 pivoted on the housing 43 as at 60 and carrying forks 61, provided with rollers 61a, adapted to engage and ride in the peripheral groove 62 of the collar 58. The lever 59 may be moved by means of the control rod 63 which in turn is coupled with the control lever 64 pivoted at 65.

Torque is delivered from shaft 49 to the rotor by means of a bevel pinion 66 which is splined to shaft 49 and which meshes with a cooperating bevel gear 67 mounted on shaft 68 carried by bearings 69—69 in a housing extension 70. The shaft 68 is provided with elements of a dog clutch 71 adapted to engage with complementary formed elements 72 at the lower end of a sleeve 73 which is movable axially on a shaft 74 journaled by bearings 75 and 75a. The collar 73 and shaft 74 are joined with freedom for relative axial movement so as to permit engagement and disengagement of the dog clutch 71—72. This engagement and disengagement may be effected in a manner similar to that described above in connection with the collar 58. An actuating arm 76 pivoted on the housing extension 70 as at 77 serves to move a yoke 78 carrying rollers 79 riding in the peripheral groove 80 of the collar 73. The push and pull rod 81 serves to actuate the lever 76 and thus the dog clutch 71—72.

Shaft 74 is joined by universal joint 82 with shaft 83 which extends in a generally upright direction toward the rotor hub at which point it is coupled with the hub by a second universal 82 and reduction gearing 13b by means of which the engine may be operated at a speed approximating optimum efficiency during use of the rotor starter.

Torque is delivered to the rear wheel 22 by a bevel pinion 84 meshing with a cooperating bevel gear 85 having a shaft 86 journaled by bearings 87—87 in a housing extension 88. Shaft 86 and collar 89 are provided with complementary elements 90 and 91 of a dog clutch serving to couple shaft 86 with shaft 92 which, similarly to the upper shaft for the rotor drive, is provided with bearings 93 and 93a.

The actuating means for the dog clutch 90—91 comprises a yoke 94 carrying rollers 95 riding in the peripheral groove 96 of the collar 89 which is actuable by lever 97 pivoted at 98 on the housing extension 88. The lever 97 is joined by a link 99 with a still further lever 100 which is movable with the arm 76 under the influence of the control rod 81.

Thus it will be seen that the two dog clutches (one for the rotor drive and the other for the wheel drive) are both actuable by a single control element and upon examination of the drawings it will be found that these two clutches are actuated in the opposite sense. That is, movement of the control rod 81 in a forward direction disengages clutch 71—72 and engages clutch 90—91, and movement of the control rod in the other direction engages clutch 71—72 and disengages clutch 90—91.

The drive shaft 92 for the wheel 22 is coupled to an additional shaft 101 by means of a universal 102, and shaft 101 is in turn coupled to the pinion shaft 103 by a slip joint 104 and second universal 105 located close to the pivot point 38 of the wheel fork. The pinion 106 which is carried by shaft 103 meshes with the ring gear 107 mounted on the hub of wheel 22. This arrangement provides a speed reduction and thus permits operating of the engine at a speed approximating optimum efficiency during road travel. By virtue of the universal and slip joints provided in the shafting 92, 101, and 103, provision is made for the transmission of torque regardless of movement of the wheel 22 for shock absorption.

Figures 5, 6:
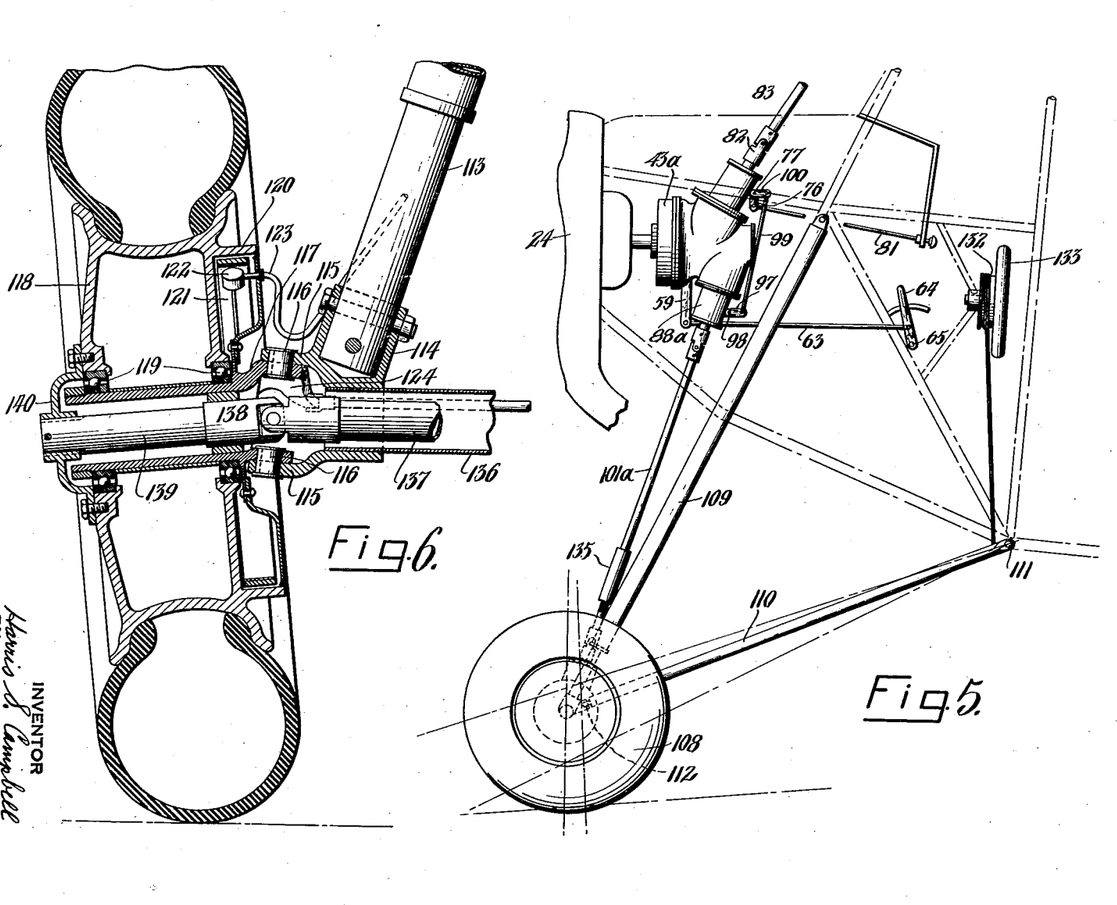
Figure 5 is a view somewhat similar to Figure 3 but illustrating a modified form of construction.
Figure 6 is an enlarged vertical sectional view taken through one of the landing wheels of the arrangement of Figure 5 and showing features of the mounting and driving mechanism therefor.
Figure 7:
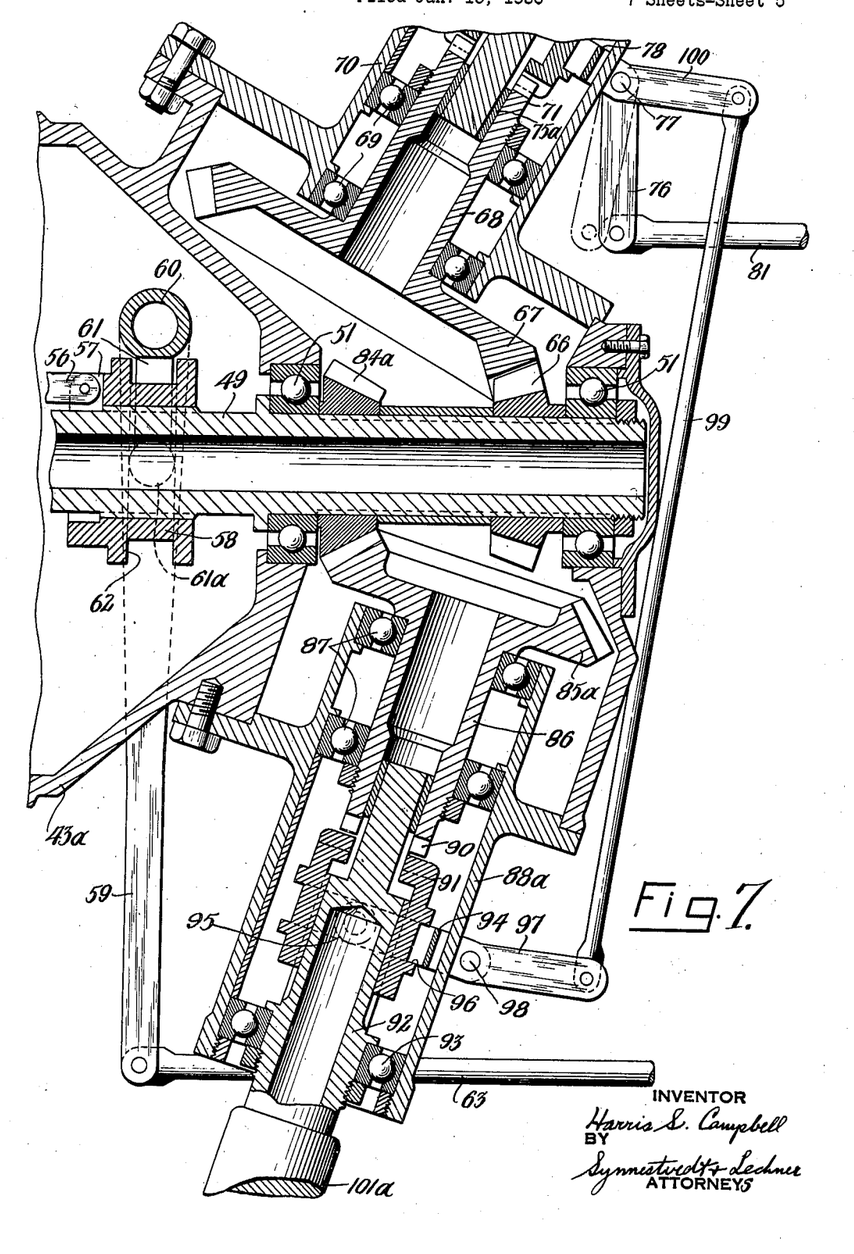
Figure 7 is an enlarged vertical sectional view similar to the showing of Figure 4 but illustrating a modified form of power take-off, clutch and gearing unit.
Figure 8:
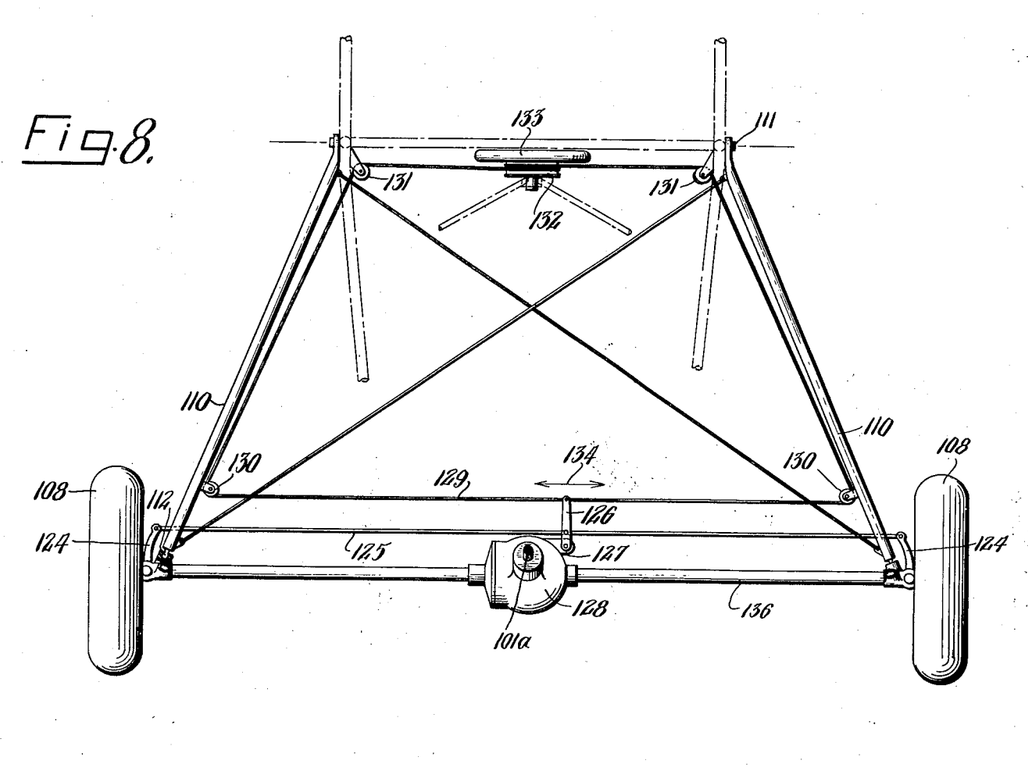
Figure 8 is a top plan view of the undercarriage and landing wheels, with portions of the controls and driving mechanism for the wheels also included.
Figure 9:
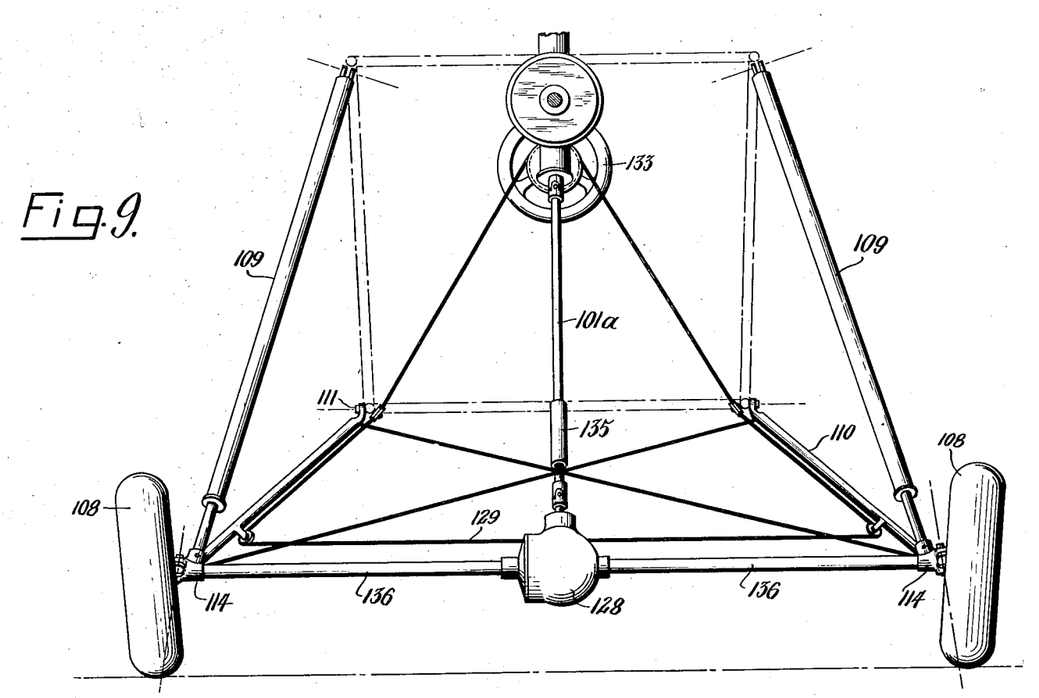
Figure 9 is a front elevational view of the structure shown in Figure 8.

Referring now to the arrangement shown in Figures 5 to 9 inclusive, reference is first made to Figure 5 in which a pair of forward landing wheels 108 appear, these wheels being carried by shock struts 109 (see also Figure 9) and by the struts 110 which are pivoted to the fuselage framing at 111 and universally joined to the wheel supports as indicated at 112 in Figures 5 and 8.

For further details of this structure reference should be made to Figure 6 from which it will be seen that the lower element 113 of the shock strut 109 is secured to the fitting 114, this fitting being provided with a pair of apertured lugs 115 journaling the pins 116, which latter cooperate with the wheel spindle 117, providing a generally upright pivot axis about which the wheel may be moved for the purposes of steering the machine when it is on the ground.

The wheel hub 118 is carried on the spindle 117 by means of bearings 119—119.

The wheel hub is also provided with a drum-like flange 120 with which the internal expanding brake 121 cooperates. This brake may be actuated by a fluid pressure and piston device 122 controlled through the flexible tube 123.

Movement of the wheel about the axis provided by pins 116 is effected by a horn or arm 124 which is coupled by the push rod 125 with a lever 126 which lever is pivoted to an ear 127 carried on the housing 128 of a differential to be referred to hereinafter. The remainder of the steering connections include closed circuit control cable 129 secured to lever 126 and riding on pulleys 130 which are carried on the struts 110. Additional pulleys 131 cooperate in bringing the control cable 129 to the drum 132 on which the cable is wound. The steering wheel 133 serves to move the cable 129 in either direction as indicated by the arrow 134 in Figure 8 and thus to rock lever 126 and actuate the horns 124 through the medium of the push rod 125.

In addition to the arrangements for steering and braking these wheels already described, the invention further contemplates provision for driving this pair of wheels. The drive is accomplished by a mechanism similar to that described above in connection with Figure 4. As seen in Figures 5 and 7, a housing 43a serves to mount the gearing and clutch unit in a position just to the rear of the engine 24. The arrangement of "master" clutch described above in connection with Figure 4 is also employed in the modification of Figures 5 to 9 and this mechanism will therefore not be described again.

Similarly the modification of Figures 5 to 9 contemplates the transmission of torque to the rotor for starting or "jump-off" purposes and parts employed to accomplish this are again similar to those shown in Figure 4. The parts for driving the wheels, however, are somewhat modified. As seen in Figure 7 the housing extension 88a projects downwardly at a different angle than that of Figure 4. This housing extension, however, serves to mount operating parts similar to those fully discussed above although it will be noted that the bevel pinion 84a is inverted in position so as to bring it into proper relation to the cooperating bevel gear 85a at its new angle.

The actuating mechanism 81, 76, 100, 99, and 97, is also the same as described above, although the positions of the parts are slightly modified.

The drive shaft for the wheels 101a is in this instance equipped with a relatively long travel slip joint 135, this being necessary because of the approximate parallelism of the drive shaft and the shock struts 109. The lower end of this drive shaft enters the differential housing 128 and this housing is interbraced with the wheel supporting fittings 114 by means of non-rotative tubes 136. The internal structure of the differential need not be shown herein since it may take the known form of the planetary gear type, or may comprise a couple of free wheel devices, one for each shaft 137. As best seen in Figure 6, each tube serves to house a torque shaft 137 which is provided with a universal joint 138 having its axes positioned substantially in the plane of the pivot pins 116 about which the wheel is movable for steering. The torque shaft extension 139 is splined with fitting 140 which in turn is secured to the wheel hub 118 and thus serves to transmit the driving torque through the shafting to the wheel.

From the foregoing it will be seen that in the arrangement of Figures 5 to 9 inclusive, provision is made for driving, braking, and steering with a single pair of wheels, the wheels further being mounted and with relatively long travel shock absorption which may be desired to accommodate landing shocks.

In operation of either form of mechanism above described, and assuming that a take-off is to be made, the manipulations referred to below may be followed:

After starting of the propulsion engine (and with the air-screw mounted thereon) the control lever 81 is pulled rearwardly so as to engage the dog clutch 71—72 and disengage the clutch 90—91. The master clutch 45—46—47 is now engaged by a rearward movement of the control lever 64 and the engine R. P. M.'s are brought up in a manner to gradually increase rotation of the rotor until the desired value for take-off or for "jump-off" is reached. The main clutch is preferably released by forward movement of lever 64 and a take-off is then effected. The wheel brakes may, of course, be applied during the time torque is delivered to the rotor so as to prevent translational movement of the craft on the ground.

Upon landing, the blades 12 of the rotor may desirably be folded over the tail by movement about the drag pivots 12b and by rearward tilting of the rotor hub on its control pivot (see dot and dash lines 12' in Fig. 1). Thereafter, the air-screw 25 may be removed and replaced by the fan 29. The machine may then be driven on the ground or a highway by a forward displacement of the control rod 81 so as to disengage the rotor clutch 71—72 and engage the wheel clutch 90—91. Control of the throttle, of the steering and braking devices, of course, provide for maneuvering on the ground.

With regard to the two forms of structure illustrated and described, it is pointed out that the mechanism is adaptable to several different forms of landing gear. Indeed, for this purpose, only relatively simple changes need be made in the design of the power take-off and gearing unit.

I claim:—

In an aircraft, a sustaining rotor, an engine, an undercarriage, mechanism for transmitting power from the engine to the rotor to drive the same, mechanism for transmitting power from the engine to the undercarriage for propulsion on the ground, a compact transmission unit including a casing for parts of both of said mechanisms, a horizontal shaft supported in the casing, a slipping clutch for connecting the horizontal shaft with the engine, a pair of bevel gears housed in said casing for transmitting power from said shaft to the rotor, a second pair of bevel gears housed in said casing for transmitting power from said shaft to said undercarriage, for each drive mechanism a positive or non-slipping clutch associated with one of the bevel gears therefor, and a control for said positive clutches incorporating interlocking means providing for alternative connection of said positive clutches and further providing against connection of both of them at the same time.

HARRIS S. CAMPBELL.